United States Patent [19]

Gaeckle et al.

[11] 4,281,942
[45] Aug. 4, 1981

[54] LUBRICATION SYSTEM FOR HIGH SPEED SPLINE CONNECTION AND BEARING

[75] Inventors: Fred J. Gaeckle; John L. Butterfield, both of Erie, Pa.

[73] Assignee: General Electric Company, Wilmington, Mass.

[21] Appl. No.: 959,851

[22] Filed: Nov. 13, 1978

[51] Int. Cl.³ .................... F16C 11/00; F16D 1/12; F16D 3/00
[52] U.S. Cl. .................................... 403/38; 403/359; 403/288; 277/206 A
[58] Field of Search ............... 403/37, 38, 288, 359; 184/6.11, 6.12; 277/206.1, 187; 74/467; 192/113 B

[56] References Cited

U.S. PATENT DOCUMENTS

| 2,888,281 | 5/1959 | Ratti | 277/206 A |
| 3,017,230 | 1/1962 | Meermans | 184/6.11 X |
| 3,038,556 | 6/1962 | Hamm et al. | 403/38 X |
| 3,720,418 | 3/1973 | Berg | 277/187 X |
| 4,086,759 | 5/1978 | Karstensen et al. | 184/6.11 X |
| 4,144,950 | 3/1979 | Moyer et al. | 184/6.11 |

Primary Examiner—Wayne L. Shedd
Attorney, Agent, or Firm—I. David Blumenfeld

[57] ABSTRACT

A lubrication system for the spline connection and generator bearing of a high speed aircraft generator which utilizes a split ring seal and quad o-ring is disclosed. The split ring seal retards lubricant flow so that there is an accumulation in the area of the splined connection which prevents wear of the splines. The retardation also forces oil to a bearing lubrication hole.

6 Claims, 3 Drawing Figures

LUBRICATION SYSTEM FOR HIGH SPEED SPLINE CONNECTION AND BEARING

BACKGROUND OF THE INVENTION

In the design of splined connecting shafts for attaching auxilliary aircraft equipment to aircraft engines, it has been found that without adequate lubrication the splines rapidly wear, become corroded, and fretted. In the design of such equipment, it is therefore a requirement that a means be found for the adequate lubrication of the splined region. Further, the generator bearing which is generally located in the region of the splines also must receive an adequate source of lubricating oil. Therefore, any system that provides for adequate lubrication of the splines must also consider the lubrication requirements of the bearing.

In spline systems of the type used in aircraft engines at speeds ranging from 20,000-27,000 rpm, it has been found that, at these high speeds, the flow of oil to the splines is inadequate where the oil is allowed to merely pass over the splines. The apparent reason for this is that, at high speeds, the splines throw the oil outwardly and do not retain sufficient lubrication along the splined surfaces for prevention of wear, fretting and corrosion.

SUMMARY OF THE INVENTION

In this invention, there is provided a source of lubricating fluid under pressure at one side of a spline connection and a split ring seal at the opposite side. The split ring seal serves two functions in the splined connecting arrangement. The first function is that of providing a partial dam or retardation of the flow of the oil across the splined region so that a metered amount of flow is over the splines. This metered amount of flow over the splined region, essentially fills the area around the splines with oil so that adequate lubrication is provided to all of the splined surfaces. The dam also serves to retard the flow sufficiently so that a portion of the oil is forced through bearing lubricating holes located on the input side of the splines. These lubricating holes are connected to the bearings which are a part of the generator and which surround the splines. The split ring seal also serves a second function of holding the stub shaft in place when the generator is removed from the engine. The stub shaft diameters are such that a normal single piece locking device will not pass over the stub shaft diameters. The split ring design makes assembly possible.

When the assembly is rotating at high speeds, the quad o-ring forms a centrifugal seal with a case, and the two halves of the split ring are pushed up against the quad o-ring, and the inner surface of the power receiving splined tube. During rotation, the two halves of the split ring are spaced a certain distance apart, and it is this spacing which provides for flow of the fluid across the region of the split ring seal and the o-ring. The fluid flows between the ends of the split rings, and the spacing between the split rings provides a metering of the fluid flow.

Without the provisions of this split ring seal with the metered flow, oil will move rapidly out to the end of the main shaft without producing a puddle or daming effect, which is essential for lubrication of the drive splines. Further, without the damming effect, there would be no oil flow through the small radial holes which feed the bearings lubricant.

When the shaft is stationary, the o-ring compresses the rings down and against the stub shaft, and, by this compression, there is formed a reasonably effective seal against static oil leakage. This stationary seal is due to the o-ring maintaining contact with the power receiving internally splined tube, and is due to the collapse of the spaces between the ends of the split ring seal, as well as the closing of the dimension between the split ring seals and the stub shaft.

Yet another function of this invention is the use of the split ring seal for holding the stub shaft in the main shaft so that the stub shaft remains fixed to the generator when the generator is removed from the engine.

DESCRIPTION OF THE PREFERRED EMBODIMENT

Figure 1:
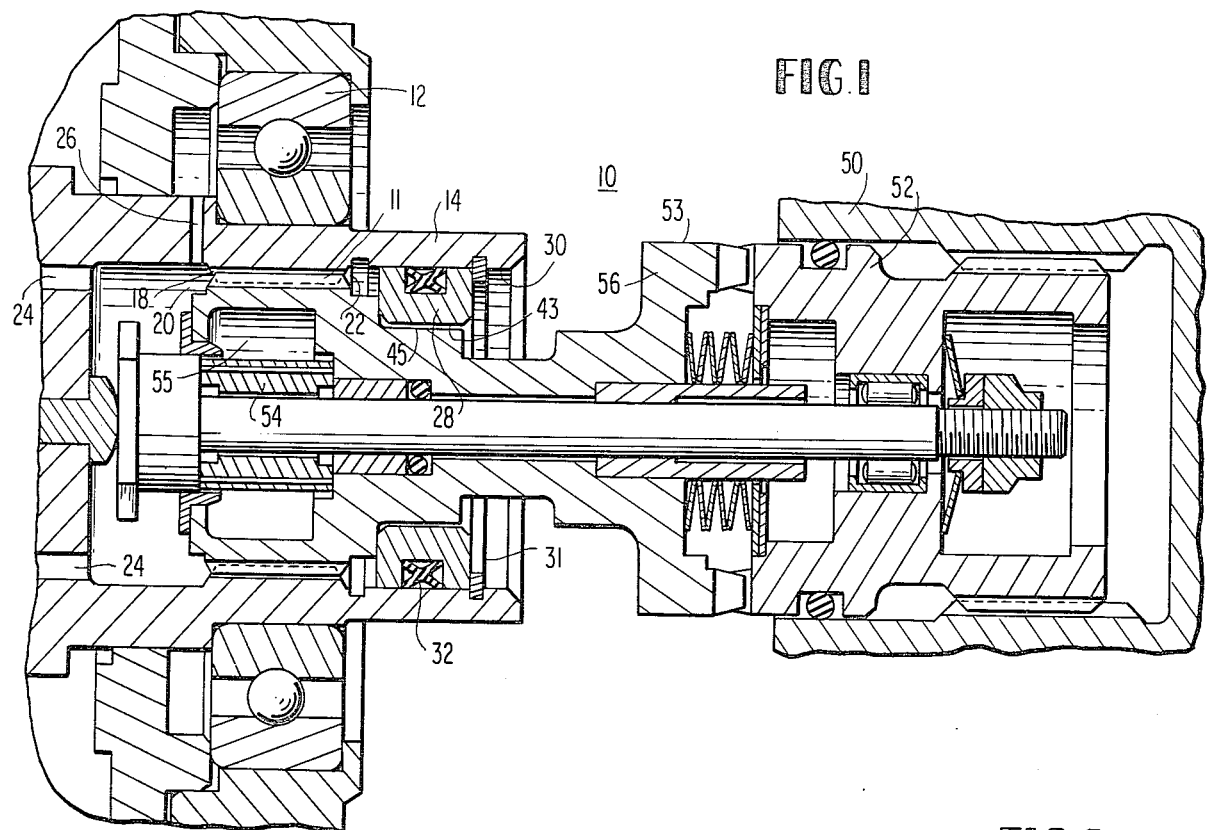
FIG. 1 shows the stub shaft assembly including the split ring seal and lubrication system.

In the preferred embodiment as depicted in FIG. 1, there is shown a generator stub shaft assembly generally depicted as 10. The stub shaft 10 is used to connect a power source 50 to a generator. The stub shaft input 52 transmits power from the source 50 to a power receiving internally splined tube 14 by an output portion 53 and a splined connection formed by external splines 11 and internal splines 18. Also shown in FIG. 1 is an eutectic disconnect means 54 and an eutectic containment cavity 55 which are described in my co-pending application, U.S. Ser. No. 960,023, to F. J. Gaeckle filed Nov. 13, 1978.

Figure 2:
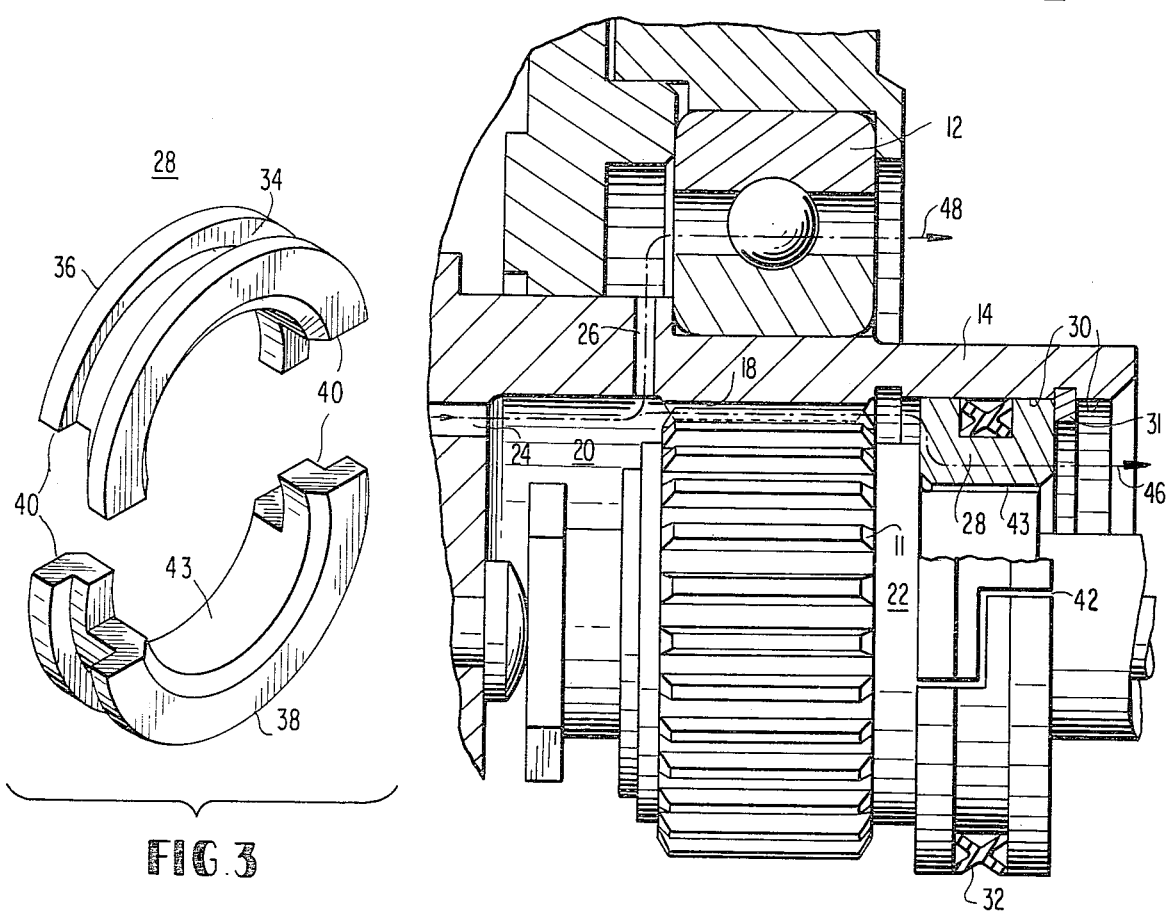
FIG. 2 is an expanded view of the split ring seal and the splined connection showing the oil flow paths through the spline and to the bearing.

The oil flow across the splined connection is shown in FIG. 2 and is depicted as entering at a port 24, which is connected to a source of high pressure engine lubricating oil which is not shown. The oil flows, as shown, to the region of the splined connection where the oil paths separate and a portion flows through a tube 26 to a bearing 12. A second portion of the oil flows across splines 11 and 18 and to a split ring seal 28. The split ring seal 28 is the means for retarding the flow of the oil, and for forcing a portion of the oil into tube 26. This means for retarding the oil flow 28 produces the cooling of oil in the region of the splined connection and provides for the adequate lubrication of the spline connections 11, 18, as well as the bearing 12.

Referring now to FIG. 1, there is depicted external splines 11 on the output or stub shaft portion 53 which are connected with the internal splines 18 of the power receiving tube 14. The power receiving tube 14 has internal splines 18 which form the splined connection with external splines 11. The power receiving internally splined tube 14 also has a smooth portion 30, which holds the split ring seal means 28.

The splined connection formed by splines 11 and 18 has a first side 20 which receives oil from a high pressure source connected to a port 24 and a second side 22 which is an exit side of the spline. Oil flows to the exit 22 and to the split ring seal means 28. Tube 26 feeds the oil to the bearing 12.

Figure 3:
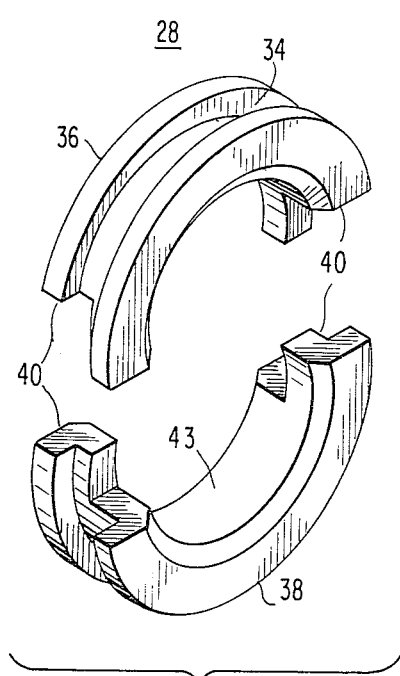
FIG. 3 is a detailed view of the split ring assembly.

In FIG. 3, there is depicted an expanded view of the split ring seal 28. The split ring seal means has an upper half 36 and a lower half 38. The ends of the split ring seal are offset ends, and are generally depicted as ends 40. The split ring seal 28 also has a radially inwardly extending grove 34 which is used to hold the quad o-ring 32.

The split ring seal halves 36 and 38 are constructed so that when the split ring seal is in contact with the smooth portion 30 of the power receiving member, there is a slight space between the ends of said o-rings. This space is generally depicted in FIG. 2 as reference numeral 42. A smooth portion 30 of the power receiving means retains the quad o-ring and the split ring during high speed rotation. When the split ring halves 36 and 38 are in contact with the smooth surface 30, the spaces 42 are formed between the ends 40 of the split rings.

When the stub shaft is not rotating, the o-ring compresses to a slight degree the two halves of the split ring causing the space 42 to close, and causes the split ring to close the additional gap 43 between the stub shaft 10 and the rings halves 36, 38. The quad o-ring 32 expands a sufficient amount radially so as to maintain an oil seal between the quad o-ring and surface 30. In this manner, oil leakage is prevented during nonoperation of the generator and stub shaft.

During operation at 20,000 rpm, the centrifugal force pushes the two halves of the split ring into close contact with the surface 30, and compresses the quad o-ring to form a seal at surface 30. However, when this occurs, the space between the o-rings opens up to form a space 42. This space 42 allows a limited passage of oil through the region of the split ring seal, and provides for the metering of the fluid across the splined region.

The determination of the space 42 is dependent upon the desired amount of oil flow or retardation in the splined region.

In addition to the split ring seal, there is also shown a retaining ring 31. The retaining ring holds the split ring seal 28 in place, and also in cooperation with the split ring seal 28 serves a secondary function of preventing parting of the splined connections 11, 18 from substantial movement during removal of the generator from the engine.

Further, the split ring seal means 28 and retaining ring 31 permit assembly of the split ring. It is to be noted in FIG. 1 that the diameter of the stub shaft at splined region 11 is greater than the diameter of the stub shaft at the inside diameter of the split ring (43). Similarly, the diameter of the stub shaft at the gear connection 55 is also greater than the diameter of the seal. Therefore, the only feasible means of assembly of this seal and retainer is by use of a split ring device which may be fitted over the shaft 10. Partial retention is provided by the o-ring 32 during assembly.

Any changes, modifications, alterations, or other uses or applications which do not depart from the scope and spirit of this invention are deemed to be covered by the invention, which is limited only by the scope of the claims which follow.

What is claimed is:

1. A spline and bearing lubrication system for use in high speed aircraft generator drive systems having:
   a stub shaft having external splines for transmitting power,
   a power receiving internally splined tube having a splined portion and a smooth portion,
   a bearing located around said power receiving internally splined tube,
   a splined connection formed by the stub shaft external spline and the power receiving internally splined tube, said connection having first and second ends,
   a source of high pressure engine lubricating oil which is supplied to said first end of said splined connection, the improvement comprising:
      a lubrication hole connecting said first side of said splined connection to said generator bearing for supplying said engine lubricating oil to said generator bearing and
      means located at said second end of said splined connection and secured to said power receiving splined tube for retarding the flow of said oil across said splined connection, for forcing a portion of said oil into said lubrication hole and for preventing fretting or corrosion of said splined connection.

2. The apparatus of claim 1 wherein said means for retarding the flow of oil across said splined connection, comprises a split ring seal means mounted within said smooth portion of said power receiving internally splined tube, and having a radially inwardly extending annular groove around the outer circumferential surface.

3. The apparatus of claim 2 wherein a quad o-ring is mounted within said internally extending annular groove.

4. The apparatus of claim 1 or 2 wherein said split ring has a first semicircular seal member, and a second semicircular seal member, and wherein said first and second semicircular members have ends which are spaced apart by a predetermined distance when said rings are in contact with said smooth portion of said power receiving tube during high speed rotation.

5. The apparatus of claim 4 wherein said predetermined distance between the ends of said split rings is determined in accordance with the desired rate of lubricant flow across the splined connection.

6. The apparatus of claim 2 further including means mounted on said smooth portion of said power receiving internally splined tube for retaining said split ring seal means in place against axial movement.

* * * * *